United States Patent
Khan et al.

(10) Patent No.: US 12,059,666 B1
(45) Date of Patent: Aug. 13, 2024

(54) TIO₂-SURFACE MODIFIED BIO-ADSORBENT

(71) Applicant: KING FAISAL UNIVERSITY, Al-Ahsa (SA)

(72) Inventors: Hayat Khan, Al-Ahsa (SA); Mansoor Ul Hassan Shah, Peshawar (PK)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/585,570

(22) Filed: Feb. 23, 2024

(51) Int. Cl.
| | | |
|---|---|---|
| B01J 20/22 | (2006.01) | |
| B01J 20/06 | (2006.01) | |
| B01J 20/28 | (2006.01) | |
| B01J 20/30 | (2006.01) | |
| B01J 20/32 | (2006.01) | |
| C02F 1/28 | (2023.01) | |
| C02F 101/30 | (2006.01) | |

(52) U.S. Cl.
CPC ............... *B01J 20/22* (2013.01); *B01J 20/06* (2013.01); *B01J 20/28004* (2013.01); *B01J 20/28016* (2013.01); *B01J 20/3028* (2013.01); *B01J 20/3236* (2013.01); *C02F 1/288* (2013.01); *C02F 1/281* (2013.01); *C02F 1/286* (2013.01); *C02F 2101/308* (2013.01); *C02F 2305/08* (2013.01)

(58) Field of Classification Search
None
See application file for complete search history.

(56) References Cited

FOREIGN PATENT DOCUMENTS

WO  WO-2021087658 A1 * 5/2021 ............. C09K 8/805

OTHER PUBLICATIONS

Kumari, Anshu. "Fabrication of Metal Oxide/Activated Carbon Nanocomposite from Jujube (*Ziziphus Mauritiana*) Seeds for Photodegradation of Dye." Diss. IOE Pulchowk Campus, 2022.
Pravalika, K. Venkata, et al. "A new effective adsorbent derived from the barks of Ziziphus mauritiana plant for the removal of chromate from polluted water." rem 60 (2018): 80.
Regti, Abdelmajid, et al. "The potential use of activated carbon prepared from *Ziziphus* species for removing dyes from waste waters." Applied Water Science 7 (2017): 4099-4108.
Yaseen, Zobia, et al. "Efficient Adsorption Kinetic Studies of Chromium from Effluents Using Ziziphus mauritiana Leaf Extract Mediated TiO2 Nanoparticles." Asian Journal of Chemical Sciences 14.1 (2023): 13-27.

* cited by examiner

*Primary Examiner* — Krishnan S Menon
(74) *Attorney, Agent, or Firm* — Nath, Goldberg & Meyer; Joshua B. Goldberg

(57) ABSTRACT

A surface-modified bio-adsorbent including *Ziziphus Mauritiana* biomass particles and TiO₂ nanoparticles anchored on a surface of the *Ziziphus Mauritiana* biomass particles. The bio-adsorbent can be in powder form and the *Ziziphus Mauritiana* biomass particles can have a particle size ranging from about 25 μm to about 250 μm.

13 Claims, 2 Drawing Sheets

TIO$_2$-SURFACE MODIFIED BIO-ADSORBENT

BACKGROUND

1. Field

The present disclosure relates to adsorbents for organic dyes and, particularly, to a composite adsorbent for removing organic dyes from wastewater.

2. Description of the Related Art

Water pollution is the introduction of physical, chemical, and/or biological substances into bodies of water that spoils the purity of the water, which ultimately causes hazardous effects on living species, including those that consume the water. Water pollution is a very persistent problem, and the intensive disposal of different toxic substances without control constitutes a real danger.

Wastewater from the manufacture of textiles, cosmetics, printing, dyeing, food coloring, paper making, etc., is often polluted by dyes. It has been estimated that about 1-15% of dyes are lost during the dyeing process in the textile industry and are eventually released as wastewater. These colored effluents pollute both surface water and the ground water system. Many dyes and pigments are toxic carcinogens and produce mutagenic effects. Organic dyes, such as Congo red, methyl blue, methylene blue, malachite green, rhodamine B, bromophenol blue. and rose Bengal dyes, are toxic and may cause cancer and other health side effects for both humans and aquatic life.

Dyes, when discharged into receiving streams, will generally cause detrimental effects on the liver, gill, kidney, intestine, gonads, and pituitary gonadotrophic cells of aquatic life. In humans, they may cause irritation to the respiratory tract if inhaled, and irritation to the gastrointestinal tract if ingested. Contact of the dyes with skin and eyes may cause irritation with redness and permanent injury in other cases.

Some solutions which have been contemplated for decontaminating waters include extraction with solvents, reverse osmosis, absorption on zeolites and absorption on activated carbon. As dyes in wastewater cannot be efficiently decolorized by traditional methods, the adsorption of synthetic dyes on inexpensive and efficient solid supports is considered a simple and economical method for their removal from water and wastewater.

Thus, a bio-adsorbent solving the aforementioned problems is desired.

SUMMARY

In an embodiment, the present subject matter relates to a surface-modified bio-adsorbent including *Ziziphus Mauritiana* biomass particles and TiO$_2$ nanoparticles anchored on a surface of the *Ziziphus Mauritiana* (ZMT) biomass particles. The bio-adsorbent can be in powder form and the *Ziziphus Mauritiana* biomass particles can have a particle size ranging from about 25 μm to about 250 μm. In an embodiment, a ratio of *Ziziphus Mauritiana* biomass particles to TiO$_2$ nanoparticles can range from about 0.1:0.9 to about 0.9:0.1. In an embodiment, the surface-modified bio-adsorbent can be contacted with wastewater to adsorb an organic dye therefrom. In an embodiment, the organic dye can be methylene blue.

According to an embodiment, the surface-modified bio-adsorbent can be prepared by reducing dried biomass material to a powder form with biomass particle sizes ranging from about 125 μm to about 250 μm. In an embodiment, a surface of the bio-adsorbent can be modified by TiO$_2$ nanoparticles to provide the surface-modified bio-adsorbent. In an embodiment, the TiO$_2$ nanoparticles can be synthesized by a sol-gel process at room temperature (25° C.).

These and other features of the present subject matter will become readily apparent upon further review of the following specification.

DETAILED DESCRIPTION OF THE PREFERRED EMBODIMENTS

Figure 1A:
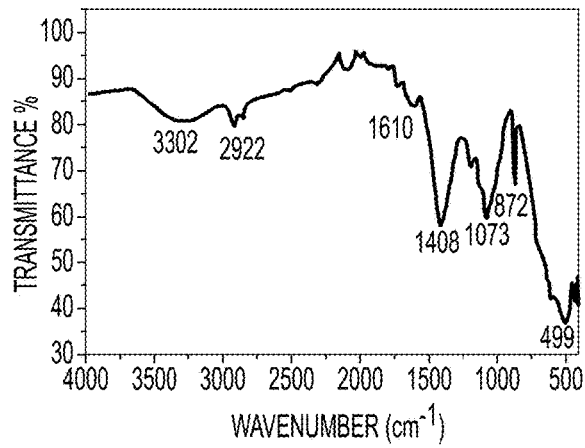
FIGS. 1A-1B depict (1A) FTIR analysis and (1B) XRD spectra of the surface-modified bio-adsorbent (ZMT).

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

In an embodiment, the present subject matter relates to a surface-modified bio-adsorbent including *Ziziphus Mauritiana* biomass particles and $TiO_2$ nanoparticles anchored on a surface of the *Ziziphus Mauritiana* biomass particles. The bio-adsorbent can be in powder form and the *Ziziphus Mauritiana* biomass particles can have a particle size ranging from about 25 µm to about 250 µm. In an embodiment, a ratio of *Ziziphus Mauritiana* biomass particles to $TiO_2$ nanoparticles can range from about 0.1:0.9 to about 0.9:0.1.

According to an embodiment, a method of adsorbing an organic dye from wastewater can include contacting the surface-modified bio-adsorbent with the wastewater to adsorb an organic dye therefrom. In an embodiment, the organic dye can be methylene blue.

According to an embodiment, the surface-modified bio-adsorbent can be prepared by washing *Ziziphus Mauritiana* plant biomass and drying the washed plant biomass to remove any moisture content. In an embodiment, the plant biomass can be subjected to an oven-drying process at a temperature ranging from about 90° C. to about 110° C., e.g., about 105° C., for a period of time ranging from about 1 hour to about 7 hours, e.g., about 5 hours. In an embodiment, *Ziziphus Mauritiana* plant biomass can include *Ziziphus Mauritiana* leaves biomass. The dried biomass material can be crushed, blended, and/or pulverized using a ball mill, resulting in a bio-adsorbent powder with biomass particle sizes ranging from about 125 µm to about 250 µm.

According to an embodiment, a surface of the bio-adsorbent particles can be modified by anchoring $TiO_2$ nanoparticles thereon to provide the surface-modified bio-adsorbent.

In an embodiment, the $TiO_2$ nanoparticles can be synthesized by a sol-gel process at room temperature)(25° C.).

Different ratios (w/w) of bio-adsorbents and $TiO_2$ nano particles can be prepared as shown in Table 1. In an embodiment, an optimum ratio of bio-adsorbent and $TiO_2$ nano particles is 60:40 (w/w).

TABLE 1

Methylene blue (MB) removal efficiency of the green bio-adsorbent (ZMT)

| Bio-adsorbent: $TiO_2$ ratios (w/w) | Adsorption capacity (mg/g) | MB removal efficiency (%) |
|---|---|---|
| 0.1:0.9 | 11.52 | 88.6 |
| 0.2:0.8 | 12.05 | 89.3 |
| 0.3:0.7 | 12.32 | 92.4 |
| 0.4:0.6 | 12.34 | 92.8 |
| 0.5:0.5 | 12.43 | 93.8 |
| 0.6:0.4 | 13.79 | 96.8 |
| 0.7:0.3 | 12.42 | 94.1 |
| 0.8:0.2 | 11.56 | 92.2 |
| 0.9:0.1 | 11.43 | 91.1 |

According to one embodiment, modifying the surface of the bio-adsorbent with $TiO_2$ nanoparticles can include suspending $TiO_2$ nanoparticles in acetone to provide a mixture, and adding a predetermined amount of bio-adsorbent to the mixture, e.g., under vigorous magnetic stirring. In an embodiment, the mixture can be stirred for a period of time ranging from about 1 hour to about 5 hours, e.g., about 2 hours, to provide the surface-modified bio-adsorbent. Afterwards, the bio-adsorbent can be dried, e.g., at a temperature of about 300° C., for a time period, e.g., about twelve hours, to provide the surface modified bio-adsorbent in the form of dried pellets. The dried pellets can be ground to a powder form.

According to an alternative embodiment, modifying the surface of the bio-adsorbent can include adding the bio-adsorbent to ethanol while stirring, e.g., using magnetic stirring, followed by the addition of titanium butoxide (organic $TiO_2$ precursor). Then, deionized water can be added drop-wise under continuous stirring. The titanium precursor can then be hydrolyzed, resulting in the formation of precipitated titanium hydroxide ($Ti(OH)_4$) that can be anchored on the bio-adsorbent. Stirring can be continued for an additional period of time, e.g., about two hours. Then, pH 2 water, e.g., a mixture of deionized water and formic acid, can be added drop-wise to the suspension and kept under stirring for a period of time, e.g., about one hour, to provide an acidified suspension. Then, the acidified suspension can be aged for a period of time for gel formation, followed by drying. In an embodiment, the drying can take place at a first temperature ranging from about 70° C. to about 90° C., e.g., about 80° C., then the temperature can be raised to a second temperature ranging from about 100° C. to about 400° C., e.g., about 300° C., for about 11 hours to about 15 hours, e.g., about 12 hours, to provide the surface-modified bio-adsorbent in pellet form. The pelletized material can then be ground to a powder form.

According to an embodiment, the $TiO_2$ nanoparticles can be commercially available $TiO_2$ nanoparticles. Alternatively, the $TiO_2$ nanoparticles can be obtained using a sol-gel process.

In one embodiment, the $TiO_2$ nanoparticles can be prepared by adding titanium butoxide, e.g., about 5 ml, to ethanol, e.g., about 20 ml, under vigorous magnetic stirring for a period of time, e.g., about 30 min. Then, deionized water, e.g., about 20 ml, can be added drop-wise to the solution to achieve a hydrolysis/condensation reaction that can result in a milky sol of titanium hydroxide. The milky sol of $Ti(OH)_4$ can be stirred, e.g., by magnetic stirring, followed by addition of pH 2 water (a mixture of deionized water and formic acid). In an embodiment, the milky sol of $Ti(OH)_4$ can be stirred for about 2 hours followed by the drop-wise addition of about 15 ml pH 2 water and stirred for about two additional hours. Then, stirring can be stopped and the sol solution can be maintained or aged, e.g., for about five hours, for gel formation to form a stabilized gel. The stabilized gel can be dried at a first temperature, e.g., in an electric oven at a first temperature, e.g., about 85° C., for about 24 hours, then the temperature can be raised to a second temperature, e.g., about 300° C., for about 12 hours, to form the $TiO_2$ nanoparticles in pellet form. The pellets can be ground to a powder.

In another embodiment, $TiO_2$ nanoparticles can be prepared by adding an ammonium hydroxide ($NH_4OH$) solution drop-wise with constant stirring to a solution of titanium oxysulfate ($TiOSO_4$) until the reaction mixture attains a pH value of about 7. The resulting titanium hydroxide precipitate can be separated from the mother liquor through centrifugation and thoroughly washed with warm deionized water, e.g., water having a temperature of about 40° C. The resulting precipitate can then be dispersed into water followed by peptization. For example, formic acid can be added to the water until a pH value of about 2 is obtained. The resulting sol can be maintained or aged for a period of time, e.g., about 5 hours at room temperature, to obtain a gel that can be dried, e.g., in an electric oven, at a first temperature, e.g., about 85° C., for about twelve hours. Then, the temperature can be raised to a second temperature, about 300° C., for about twelve additional hours. The dried gel can be in the form of solid pellets which can be ground to produce the $TiO_2$ powders.

The present subject matter can be better understood by referring to the following examples.

EXAMPLES

Example 1

Preparation of Surface-Modified Adsorbent

*Ziziphus Mauritiana* (ZM) leaves biomass was carefully washed with deionized water and subsequently subjected to oven-drying at 105° C. for 5 hours to eliminate any moisture content. The dried biomass material was crushed, blended, and pulverized using a ball mill, resulting in powders with sizes ranging from 125 μm to 250 μm that act as a bio-adsorbent. Afterward, the surface of the bio-adsorbent was modified by $TiO_2$ nanoparticles.

The as-prepared $TiO_2$ nanoparticles were suspended in acetone (30 ml) then the weighted (w/w) amount of bio-adsorbent was added under vigorous magnetic stirring for two hours to provide the surface-modified bio-adsorbent. Afterward, the surface-modified bio-adsorbent was dried at 105° C. overnight to provide dried pellets. The dried pellets were ground to a powder using a mortar and pestle.

Example 2

Preparation of Surface-Modified Adsorbent

*Ziziphus Mauritiana* leaves biomass was carefully washed with deionized water and subsequently subjected to an oven-drying process at 105° C. for 5 hours to eliminate any moisture content. The dried biomass material was crushed, blended, and pulverized using a ball mill, resulting in powders with sizes ranging from 125 μm to 250 μm that act as a bio-adsorbent.

The bio-adsorbent was added to 20 ml of ethanol under constant magnetic stirring for 30 minutes followed by the addition of 5 ml titanium butoxide (organic $TiO_2$ precursor). Then deionized water (20 ml) was added drop-wise under continuous stirring. The titanium precursor was hydrolyzed which resulted in the formation of precipitated titanium hydroxide ($Ti(OH)_4$). The precipitate was anchored/adsorbed on the bio-adsorbent. The suspension was kept under magnetic stirring for an additional two hours. Then, an additional 15 ml of pH 2 water was added (D.I water+formic acid) drop-wise to the suspension, keep stirring for another 1 hour.

The acidified suspension was aged for 5 hours for gel formation, followed by oven drying for twelve hours at 80° C., then the electric oven temperature was raised to 300° C. and kept for another 12 hours. The pelletized material (modified $TiO_2$/bio-adsorbent) was ground to a powder by using a mortar and pestle.

Example 3

$TiO_2$ Nanoparticle Synthesis by Sol-Gel Method—Using Titanium Butoxide, $Ti(OBu)_4$)

Titanium butoxide (5 ml) was added quickly to 20 ml of ethanol under vigorous magnetic stirring for 30 minutes. Then, 20 ml of deionized water was added drop-wise to the solution. Upon hydrolysis/condensation, a milky sol of titanium hydroxide was formed.

The milky sol of $Ti(OH)_4$ was kept under constant magnetic stirring for 2 hours followed by drop-wise addition of 15 ml pH 2 water (deionized water and formic acid). Stirring was continued for an additional 2 hours.

After 12 hours, stirring was stopped, and the sol solution was aged for 5 hours for gel formation. The stabilized gel was dried in an electric oven at 85° C. for 24 hours. Then, the temperature was raised to 300° C. for 12 hours followed by grinding the dried pellets to a powder using a mortar and pestle.

Example 4

$TiO_2$ synthesis by Sol-Gel Method—using Titanium Oxysulfate, $TiOSO_4$

Ammonium hydroxide ($NH_4OH$) solution ((Ricca chemical, 10% v/v aqueous solution) was added drop-wise to a constantly stirred 0.2 M solution of titanium oxysulfate ($TiOSO_4$) until the reaction mixture attained and had the desired pH value of 7.

The formed titanium hydroxide precipitate was separated from the mother liquor through centrifugation, and thoroughly washed (2-3 times) with warm deionized water) (40° C.).

The precipitate was then dispersed into distilled water (50 ml) followed by peptization with the addition of formic acid until a pH value of 2 was obtained.

In the sol to gel conversion step, the stable sol was aged for the desired period (5 hours) at room temperature and the gel was dried in an electric oven at 85° C. overnight. Then, the oven temperature was raised to 300° C. for another 12 hours. The dried gel, in the form of solid pellets, was collected and ground to finally produce the $TiO_2$ powders.

Example 5

Characterization of Green Composite

To evaluate the functional groups on the surface of the bio-adsorbent, Fourier Transform Infrared Spectroscopy (FTIR) spectra was recorded as shown in FIG. 1A. A distinctive peak at 3300.0 cm$^{-1}$ suggests the presence of hydroxyl (OH) groups. Peaks at 2851.413 cm$^{-1}$ and 2922.233 cm$^{-1}$ indicate typical aliphatic (straight-chain) C—H stretching vibrations, signifying the presence of hydrocarbon-based components. An intense peak at 1610.210 cm$^{-1}$ suggests the existence of carbonyl groups (C=O), indicating the presence of organic molecules with carbonyl functionality, consistent with the sample's overall composition. In addition, the peak at 1408.934 cm$^{-1}$ may correspond to carbon-hydrogen (C—H) bending or carbon-nitrogen (C—N) stretching vibrations, providing insights into the sample's molecular components.

Lastly, lower wavenumber peaks, such as those around 872.197 cm$^{-1}$, 1073.473 cm$^{-1}$, and 1189.021 cm$^{-1}$, could be attributed to vibrations involving carbon-carbon (C—C) or carbon-oxygen (C—O—Ti) or Ti—O—Ti bonds, potentially resulting from the interaction of TiO$_2$ with organic compounds present in the leaves.

Figure 1B:
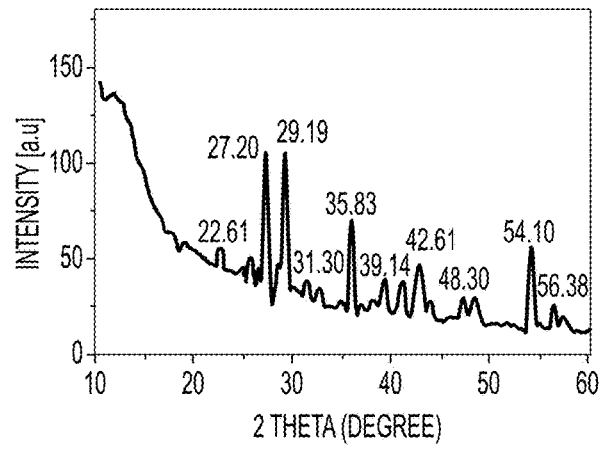
Figure 2A:
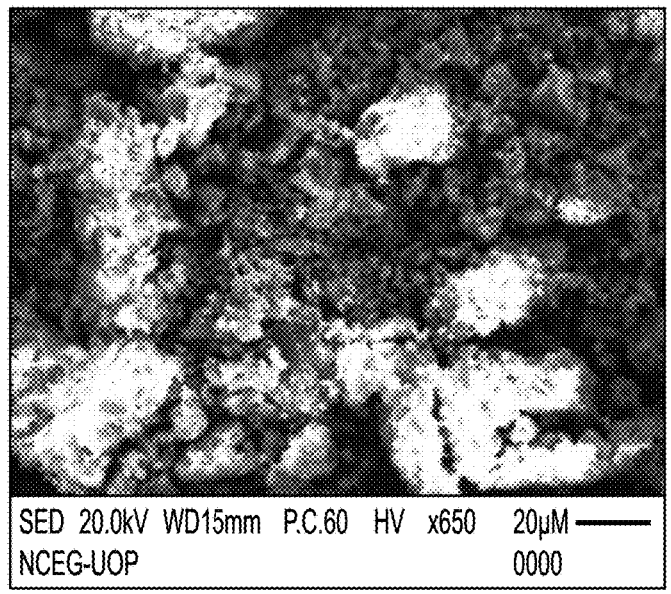
FIGS. 2A-2B depict (2A) SEM micrograph and (2B) SEM-EDX spectrum of surface-modified bio-adsorbent (ZMT).
Figure 2B:
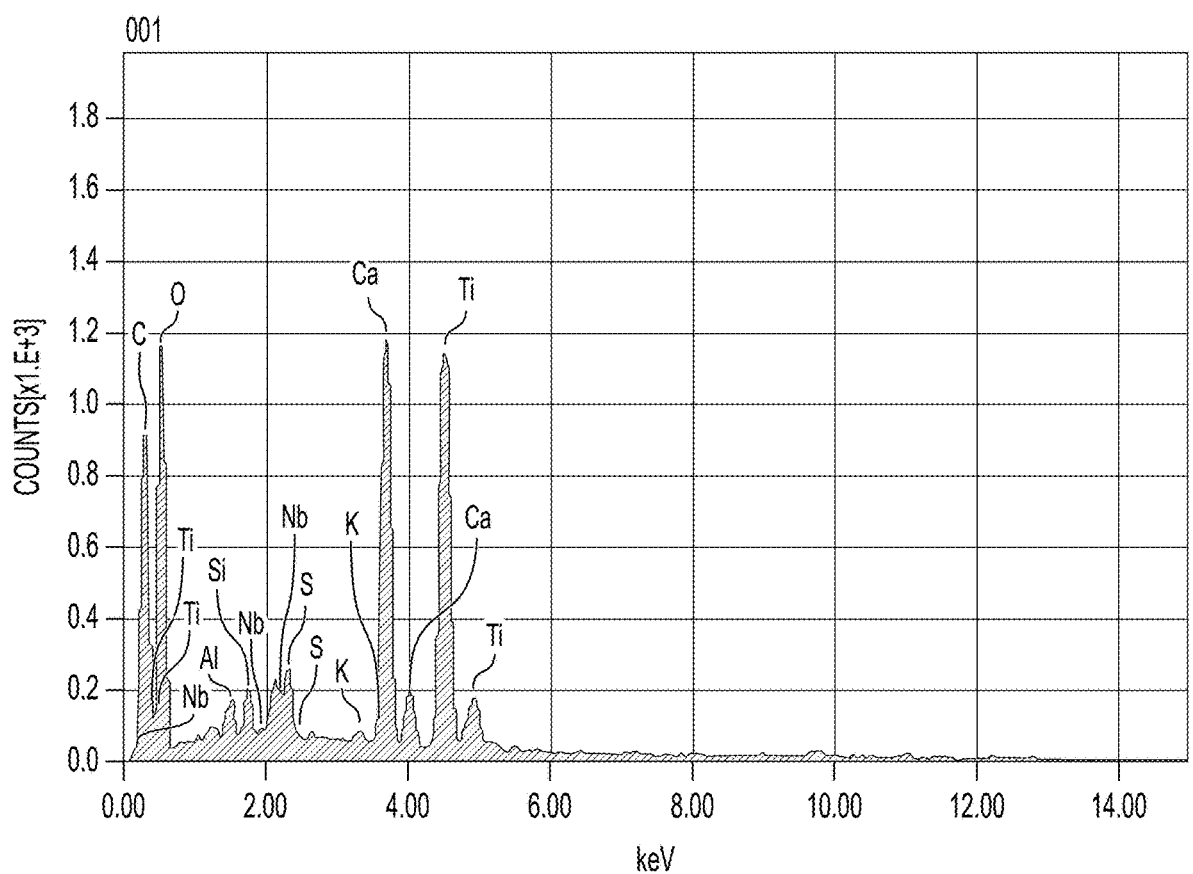

The crystalline structure of the green composite was examined using X-ray Diffraction (XRD). The diffraction peaks occurred at approximately 22.6°, 27.0°, 29.2°, 31.3°, 35.8°, 39.0°, 42.2°, 48.30° and 54.0° on 2θ x-axis. The peak at 22.6°, 27.0° and 48.30° were attributed to anatase TiO$_2$ character. These peaks confirm the composite's anatase crystal structure formation and validate the successful fabrication of anatase-phase TiO$_2$ nanoparticles. FIG. 1B shows the XRD pattern, which shows discrete diffraction peaks at various 2θ angles. The diffraction peaks with their corresponding 2θ angles and intensity FIGS. 2A and 2B illustrate the electron micrograph (FIG. 2A) and the energy dispersive X-ray spectroscopy (EDX) spectrum (FIG. 2B) of the surface-modified bio-adsorbent. The EDX spectrum clearly shows the major peaks for C, O and Ti, implying the modification of the *Ziziphus Mauritiana* particles with TiO$_2$ (ZMT).

It is to be understood that the present methods and products are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A surface-modified bio-adsorbent, comprising *Ziziphus Mauritiana* biomass particles and TiO$_2$ nanoparticles anchored on a surface of the *Ziziphus Mauritiana* biomass particles.

2. The surface-modified bio-adsorbent of claim 1 having a particle size ranging from about 25 μm to about 250 μm.

3. The surface-modified bio-adsorbent of claim 1, wherein a weight ratio of the *Ziziphus Mauritiana* biomass particles to the TiO$_2$ nanoparticles ranges from about 0.1:0.9 to about 0.9:0.1.

4. The surface-modified bio-adsorbent of claim 2, wherein the weight ratio is 0.6:0.4.

5. A method of adsorbing an organic dye from wastewater, comprising contacting the surface-modified bio-adsorbent of claim 1 with the wastewater to adsorb an organic dye therefrom.

6. The method of claim 5, wherein the organic dye comprises methylene blue.

7. A method of preparing a surface-modified bio-adsorbent, the method comprising:
reducing *Ziziphus Mauritiana* plant biomass to powder form having a particle size ranging from about 125 μm to about 250 μm; and
modifying the bio-adsorbent powder particles to include TiO$_2$ nanoparticles on a surface thereof.

8. The method of claim 7, wherein the bio-adsorbent particles are modified by a method, comprising:
suspending TiO$_2$ nanoparticles in acetone to provide a mixture;
adding the bio-adsorbent to the mixture to provide the surface-modified bio-adsorbent; and
drying the surface-modified bio-adsorbent.

9. The method of claim 8, wherein the TiO$_2$ nanoparticles are prepared by:
mixing titanium butoxide with ethanol to provide a mixture;
adding deionized water to the mixture to provide a solution including titanium hydroxide;
adding water having a pH value of 2 to the solution including titanium hydroxide after stirring;
maintaining the solution including titanium hydroxide for a period of time to form a gel;
drying the gel to form TiO$_2$ nanoparticles in pellet form; and
reducing the pellet form to a powder to obtain the TiO$_2$ nanoparticles.

10. The method of claim 8, wherein the TiO$_2$ nanoparticles are prepared by:
mixing titanium oxysulfate solution with ammonium hydroxide to provide a precipitate in a solution;
separating the precipitate;
dispersing the precipitate in deionized water to form a precipitate in solution;
adding acid to the precipitate in the solution, until a solution having a pH value of about 2 is obtained;
maintaining the solution having a pH value of about 2 for a period of time until a gel is formed;
drying the gel to form pellets; and
reducing the pellets to powder form to obtain the TiO$_2$ nanoparticles.

11. The method of claim 7, wherein the bio-adsorbent particles are modified by a method comprising:
mixing the bio-adsorbent powder particles with ethanol to provide a mixture;
adding titanium butoxide to the mixture;
adding deionized water to the mixture after the addition of the titanium butoxide to form a precipitated titanium hydroxide solution;
adding water having a pH value of about 2 to the precipitated titanium hydroxide solution to provide an acidified suspension;
maintaining the acidified suspension for a period of time to form a gel;
drying the gel to provide the surface-modified bio-adsorbent in pellet form; and
reducing the pellets to powder form.

12. A surface-modified bio-adsorbent prepared according to the method of claim 7.

13. The surface-modified bio-adsorbent of claim 12, wherein the surface-modified bio-adsorbent has a particle size ranging from about 25 μm to about 250 μm.

* * * * *